United States Patent [19]

Van Gorkum et al.

[11] Patent Number: 4,807,014
[45] Date of Patent: Feb. 21, 1989

[54] THREE TUBE COLOR PROJECTION TELEVISION SYSTEM HAVING MULTISPOT BLUE TUBE AND SINGLE-SPOT RED AND GREEN TUBES

[75] Inventors: Aart A. Van Gorkum, Tokyo, Japan; Leendert Vriens, Eindhoven, Netherlands; Arne L. Duwaer, Ossining, N.Y.; Johannes H. M. Spruit; Alexander R. H. Van Schoonhoven, both of Eindhoven, Netherlands

[73] Assignee: U.S. Philips Corporation, New York, N.Y.

[21] Appl. No.: 35,539

[22] Filed: Apr. 3, 1987

[30] Foreign Application Priority Data

Apr. 11, 1986 [GB] United Kingdom ................. 8608925

[51] Int. Cl.[4] .......................... H04N 9/31; H04N 9/20
[52] U.S. Cl. .......................... 358/65; 358/60; 358/237
[58] Field of Search ..................... 358/60, 64, 65, 237, 358/253; 313/409

[56] References Cited

U.S. PATENT DOCUMENTS

| | | | |
|---|---|---|---|
| 4,259,692 | 3/1981 | D'Amato | 358/237 |
| 4,400,722 | 8/1983 | Miyatake et al. | 358/60 |
| 4,609,945 | 9/1986 | Oguino | 358/64 |
| 4,668,977 | 5/1987 | Ohno et al. | 358/60 |

Primary Examiner—James J. Groody
Assistant Examiner—Robert M. Bauer
Attorney, Agent, or Firm—John C. Fox

[57] ABSTRACT

A projection color television system having an improved resolution and luminance comprises red, green and blue color emitting tubes, the electron beams of which are focused onto their respective screens. In order to compensate for the strong saturation of the blue phosphor, and simultaneously to take advantage of the relatively fast decay of this phosphor, the blue color emitting tube is a single gun, multispot display tube. The increase in light output obtainable from the blue color emitting tube is matched by providing interference filters in the red and green color emitting display tubes and optionally in all three red, green and blue emitting tubes.

12 Claims, 6 Drawing Sheets

THREE TUBE COLOR PROJECTION TELEVISION SYSTEM HAVING MULTISPOT BLUE TUBE AND SINGLE-SPOT RED AND GREEN TUBES

BACKGROUND OF THE INVENTION

The present invention relates to a projection television system.

In a projection television system three cathode ray tubes having phosphor screens luminescing respectively in red, green and blue are arranged either side by side in a planar array or on three sides of a square with dichroic mirrors in the centre to direct light from the two facing tubes in the same direction as the light from the centrally disposed third tube.

Existing projection television systems are regarded as having (1) a moderate to poor resolution, (2) a moderate luminosity and (3) a moderate colour rendition. The reasons behind this are that the tube formats are so small, typically between 5 and 7 inches, necessitating: (1) a very high electron-optical resolution on the phosphor screen area, (2) a very high electron beam loading to generate sufficient light after magnification on the large projection screen, and (3) phosphors with a sufficient linearity at these high electron beam loading conditions. At these high phosphor loads the light output does not proportionally increase with beam current due to saturation. This effect is most pronounced for the widely used ZnS:Ag blue phosphor but to a lesser extent it also occurs for the green Tb activated phosphors, such as YAG:Tb, $Y_2SiO_5$:Tb, LaOCl:Tb and $InBO_3$:Tb, and for the red $Y_2O_3$:Eu phosphor commonly used for projection TV. At a characteristic beam current in the green tube of 1 mA (above the typical average instantaneous current of 0.5 mA and below the maximum current of 2 to 2.5 mA), the saturation in the blue tube is so severe (typically a factor of 3 to 6 decrease in efficiency as compared to the linear efficiency; 3 for poor resolution, 6 for good resolution i.e. small spot size) that a significant amount of defocusing of the electron beam spot is necessary in that tube in order to get white-D luminance on the projection screen.

The required high beam currents also lead to increased ageing of the phosphor.

Additional problems are:

(1) the too high x-colour co-ordinate on a chromaticity chart relative to the European Broadcasting Union's recommendation of all green Tb activated phosphors and the too low y-colour co-ordinate of most of these phosphors ($InBO_3$:Tb is an exception, it has the correct y coordinate) yielding a moderate colour rendition on the projection screen, (2) the broadband spectral emission of the blue ZnS:Ag phosphor and the several spectral line emission of the green Tb activated phosphor. Upon imaging on the projection screen this broadband or multiline emission gives rise to a considerable loss of resolution due to chromatic aberration of the projection lenses.

In order to mitigate the luminance, colour rendition and chromatic aberration problems it has been proposed for example in U.S. Pat. No. 4,683,398 to provide interference filters between the phosphor layer and the glass faceplate. The interference filters improve the light output of the display tubes particularly for the red and green phosphors which have line spectra with one or a few predominant lines. The gain in light output is typically a factor of 1.5 to 1.9 for these phosphors. In addition the colour rendition in the green improves and the chromatic aberration decreases. The improvement in light output is less (about 1.3) in the case of the blue phosphor ZnS:Ag because of its broadband spectrum. With respect to light output blue is already the bottleneck when no interference filters are used. Because the gain factors due to the application of interference filters are larger in the green and red, blue essentially limits the achievable luminance both without and with interference filters.

In order to increase the light output from the blue light emitting phosphor in a conventional projection television system, i.e. without interference filters, it has been proposed to defocus vertically the spot produced at the screen of the blue tube so that each line is effectively scanned two to four times in succession when raster scanning. This leads to a lower instantaneous phosphor load and because the blue ZnS:Ag phosphor decays in about 10 us, much shorter than a typical line repetition time of 64 us, it leads to much less saturation and to a higher light output per mA of beam current. However this is accompanied by a loss in resolution in the vertical direction corresponding to the amount of defocusing. Resolution, particularly in projection television tubes, must be very high in order to resolve satisfactorily the image at the projection screen.

Multibeam (or multispot) display tubes for use in a variety of applications are known, and are described by way of example in a paper "Multiple Beam Cathode Ray Tube Design Overview", presented by Vernon D. Beck and Bruce P. Piggin at the 1985 International Display Research Conference, in U.S. Pat. Nos. 3,714,489 and 4,259,692, and in U.S. Pat. application Ser. No. 110,054.

U.S. Pat. No. 4,259,692 discloses providing a multispot projection television tube to reduce cathode output limitations, space charge and phosphor non-linearity problems. Three vertically separated spots are produced and are modulated with the aid of delay lines so that the same information is given to each spot when at a corresponding position in the same line. However, there is no suggestion of having a multispot display tube with other single spot display tubes.

SUMMARY OF THE INVENTION

It is an object of the present invention to improve simultaneously the resolution and the luminance of the image produced by a projection television system.

According to the present invention there is provided a projection colour television system comprising a red light emitting display tube, a green light emitting display tube and a blue light emitting display tube. The red and green light emitting display tubes each include a short wave pass interference filter disposed between the phosphor and the faceplate, and the blue display tube comprises means for producing at least two focused, vertically separated scannable electron beams for sequentially scanning the lines of a raster. Each the electron beams is modulated with luminance information relating to the particular line being scanned.

In the system made in accordance with the present invention, use is made of the feature of known blue phosphors of their having a decay time which is short compared with the line period in a standard 16 kHz line frequency system whereas the decay times of green and red phosphors are longer. Thus by the blue light emitting tube having two or more scannable electron beams, each beam being scanned at a repetition time of one or more television lines it is possible to distribute the total beam current over several beams thereby increasing the light output from this tube. The use of interference filters with the red and green light emitting display tubes enables the light output to be increased by 85% to 60%, respectively.

With the combination of a multibeam (or multispot) blue tube and single beam green and red tubes several advantages are gained. These include being able to make the line and frame frequencies in all three tubes the same. The light output as a function of beam current of the blue phosphor tube is increased by haivng several beams with a period between successive excitations being greater than about twice the decay time of the blue ZnS:Ag phosphor, which decay time is about 10 us ($1/e$ time). By way of example a typical ZnS:Ag phosphor will produce an increase in lgith output of the order of 2 to 3.0 when increasing the beam current from 0.5 mA to 2 mA. In contrast by having four separate electron beams at 0.5 mA, and exciting the blue phosphor at intervals greater than twice the decay time, four times the light output is obtained. By being able to reduce the beam current, when using a multibeam blue tube and requiring the same or slightly higher luminance, the resolution increases and the life of the phosphor is greater.

By providing interference filters in the red and green light emitting display tubes the chromaticity of the displayed image is improved, the chromatic aberration is reduced, and there is a gain in luminance of the order of 1.5 to 1.8. Conversely one can reduce the current in the green and red tubes to take advantage of only a part of the possible gain in luminance, but to achieve a better resolution and to increase the phosphor life.

If desired, the red, green and blue light emitting display tubes may all three be provided with interference filters to obtain further improvement in luminance, resolution and chromaticity.

The screen will have, for example, a blue ZnS:Ag phosphor, and the means in the blue light emitting display tube for producing at least two electron beams may comprise a triode type of electron gun having a cathode, an apertured grid and an apertured anode, the cathode or grid comprising at least two individually addressable sections, each section having an input connection to which video data is applied in use.

The cathode and grids can also be placed in a single plane, using a so-called integrated emitter In this case the cathodes are electrically isolated and a variable voltage applied to the integrated emitter is used to vary the emitted current. The structure of the integrated emitter is known, for example, from the paper by McCormick et al (IEEE transactions on Industrial Electronics IE, 29, May, 1982), and a description thereof is necessary to an understanding of the present invention.

In order to improve the resolution of the displayed blue image, the video information may be applied to a number of line stores which are connected, together with video input, to a respective section of the cathode or grid of the blue light emitting display tube. As the light from the blue phosphor decays substantially to zero in a television line period (64/us) then re-exciting it with a second or subsequent electron beam whose intensity has been varied substantially in the same time sequence as the original electron beam ensures that the displayed multicolour image is correct. Re-excitation of the green and red phosphors occurs only after a frame period.

The electron beams in the blue light emitting display ]tube may be focused electro-magnetically or electrostatically. In the electromagnetic case, in order to counter rotation of the electron beams relative to each other causing a loss in geometric misregistration, means, for example delay devices, are provided to ensure that the intensity variations in successive re-excited raster lines occur at substantially the same geometric position.

The faceplates of the display tubes may be flat or convex as viewed from the phosphor.

The display tubes may be arranged in a planar array or on three sides of a square with dichroic mirrors reflecting the light produced by the facing display tubes in the same direction as the light from the third display tube.

DETAILED DESCRIPTION OF THE PREFERRED EMBODIMENTS

In the drawings the same reference numerals have been used to indicate corresponding features.

Figure 1:
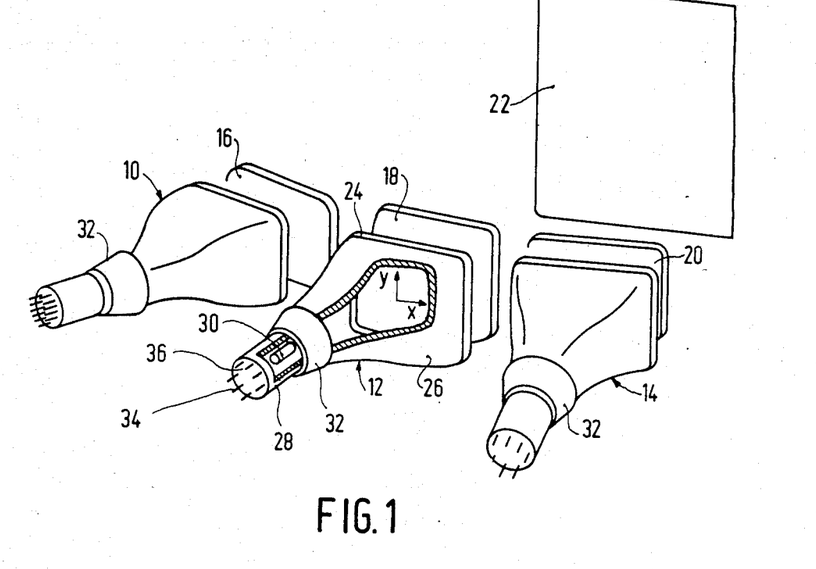
FIG. 1 is a diagrammatic perspective
in which the three display tubes are arranged side-by-side in a planar array.

Referring to FIG. 1 the projection television system shown comprises three projection television tubes 10, 12, 14 arranged in a planar array. The tubes 10, 12 and 14 respectively have display screens which luminesce in blue, green and red colours. The axes of the outer tubes 10, 14 converge relative to that of the tube 12 so that the light from these tubes can be superimposed with the aid of lenses 16, 18, 20 to form a single multicoloured image at a viewing screen 22.

By way of illustration a portion of the glass envelope of the tube 12 has been broken away. The envelope itself comprises a display window 24, a cone 26 and a neck 28. A cathodoluminescent screen is provided on the inside of the display window 24 and an electron gun 30 is located in the neck 28 of the envelope. In the green and red tubes the electron guns are single beam guns which produce a single spot at the cathodoluminescent screen whereas the electron gun of the blue tube produces a plurality of independently adjustable electron beams for example two, three or more beams. Such a gun will be referred to as a multispot electron gun. A system of deflection coils 32 around the neck of each envelope respectively deflect the electron beams of the tubes 10, 12 and 14 in two mutually perpendicular directions x, y. The electron beams of all the tubes 10, 12 and 14 are focused. Electrical connections to the interior of the envelope are by way of pins 34 in a cap 36.

Figure 2:
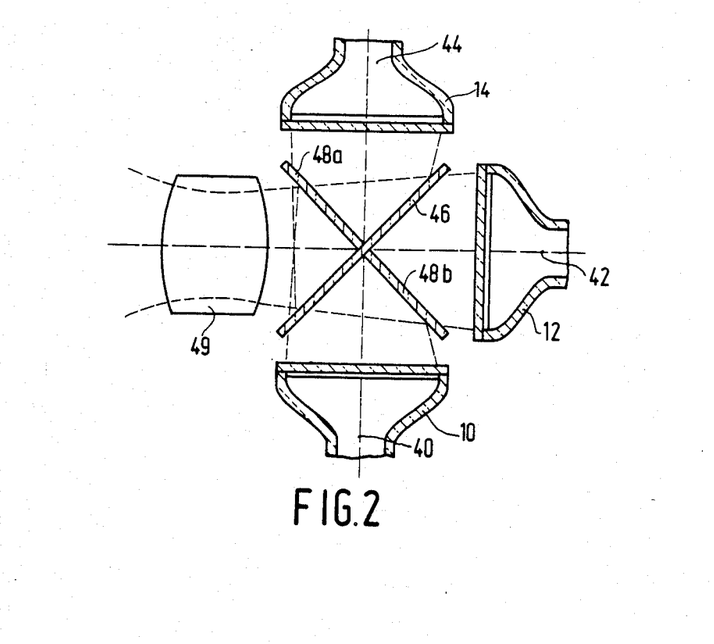
FIG. 2 is a diagrammatic partial plan view of a
system employing dichroic mirrors to direct the light from two oppositely arranged display tubes in the direction of the light from the third tube.

FIG. 2 illustrates diagrammatically another projection television system in which the three tubes 10, 12, 14 are arranged in a single plane on three sides of a square with the longitudinal axes 40, 44 of the tubes 10, 14 coincident and the longitudinal axis 42 of the tube 12 intersecting the axes 40, 44 at right angles. Orthogonally arranged dichroic mirrors 46 and 48a, 48b direct the light from the blue and red tubes 10 and 14 forward in the same direction as the light from the green tube 12. The light rays combined in this way are projected onto a projection viewing screen (not shown) by means of an aspherical lens 49.

In a non-illustrated variant of this planar array, the tubes 10, 12, 14 are mounted in the base of an open top cabinet and the light therefrom is projected by way of mirrors through the open top of the cabinet onto a screen. In another non-illustrated variant of this planar array, the tubes 10, 12, 14 are mounted in a base of a closed rear projector and the light therefrom is projected through lenses and by way of a mirror or by mirrors on the back side of a transmissive rear projection screen.

Figure 3:
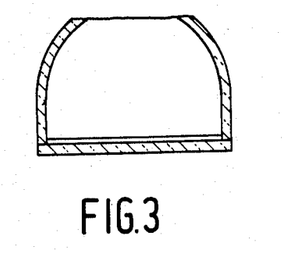
FIGS. 3 and 4 illustrate flat and convex faceplates, respectively.
Figure 4:
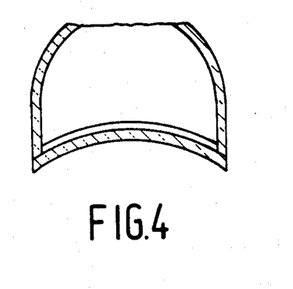

FIGS. 3 and 4 illustrate that the faceplates of all the tubes 10, 12 and 14 can be substantially flat or convex as viewed from the vacuum side. In the case of the convex faceplates the radius of curvature is typically between 150 mm and 730 mm. If desired faceplate cooling means (not shown) may be provided.

The display screens of the three display tubes may comprise any suitable phosphor material for example a silver activated zinc sulphide (ZnS:Ag) blue luminescing phosphor having a desired central wavelength of 460 nm (nanometres), a terbium activated substantially green luminescing phosphor having a desired central wavelength of 545 nm and a red phosphor of europium-activated yttrium oxide ($Y_2O_3$:Eu) having a desired central wavelength of 612 nm.

Figure 5:
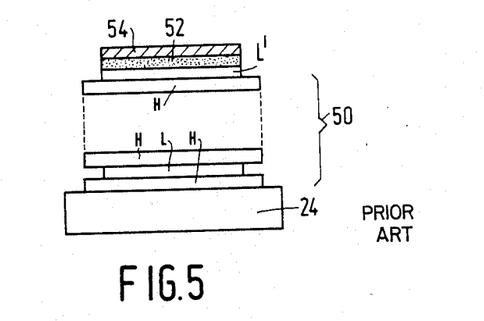
FIG. 5 illustrates diagrammatically a portion of a faceplate structure including a short wave pass interference filter.

Optionally one or more of the display screens may include a shortwave pass interference filter of the type shown in FIG. 5. These filters are known per se for example from U.S. Pat. No. 4,683,398, details of which are unnecessary to an understanding of the invention. Briefly, the display screen shown in FIG. 5 comprises the faceplate 24, a twenty layer interference filter 50, a phosphor layer 52 and an aluminium layer 54. The filter 50 comprises alternate layers having high and low refractive indices n. the low refractive index layers L comprise layers of $SiO_2$ (refractive index n =1.47) or $MgF_2$ (n=1.38) and the high refractive index layers H comprise $TiO_2$ layers having a refractive index n=2.35. The layers have a thickness of the order of 0.25 $\lambda_f$, where $\lambda_f$ is equal to p x λ, wherein λ is the desired central wavelength which is selected from the spectrum emitted by the luminescent material and the p lies between 1.18 and 1.32. The layer H nearest to the phosphor layer 52 may be coated with an approximately 0.125 $\lambda_f$ thick terminating layer L'. The number of layers in the interference filter 50 may be in the range fourteen to thirty.

Figure 6:
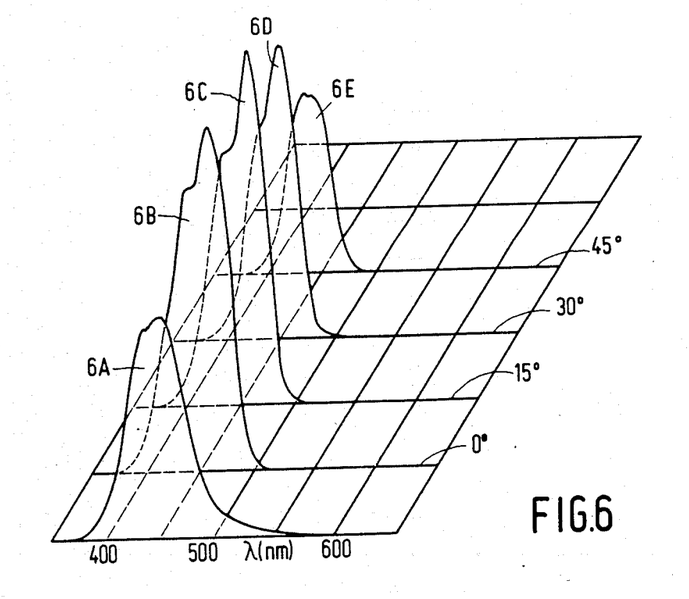
FIGS. 6, 7 and 8 illustrate the spectra of light produced by typical blue, green and red phosphors, respectively, and the improvement in gain produced by short wave pass filters.
Figure 7:
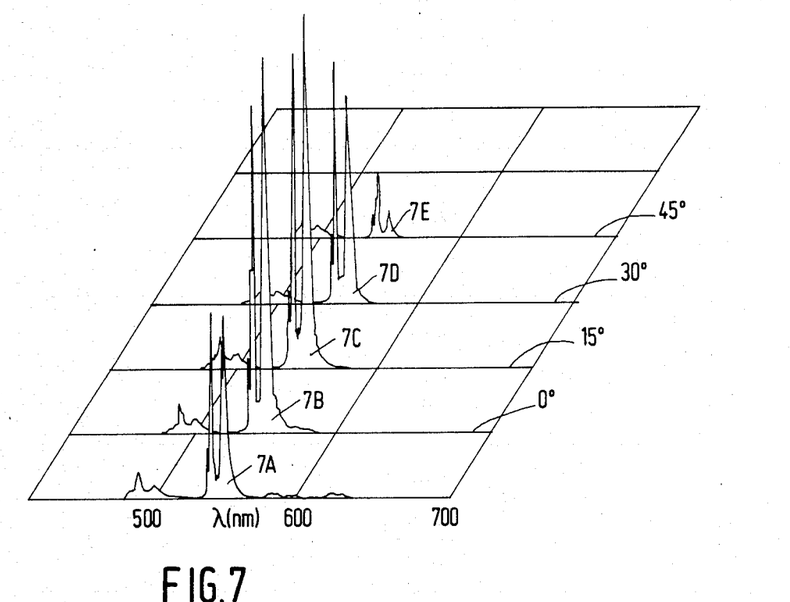
Figure 8:
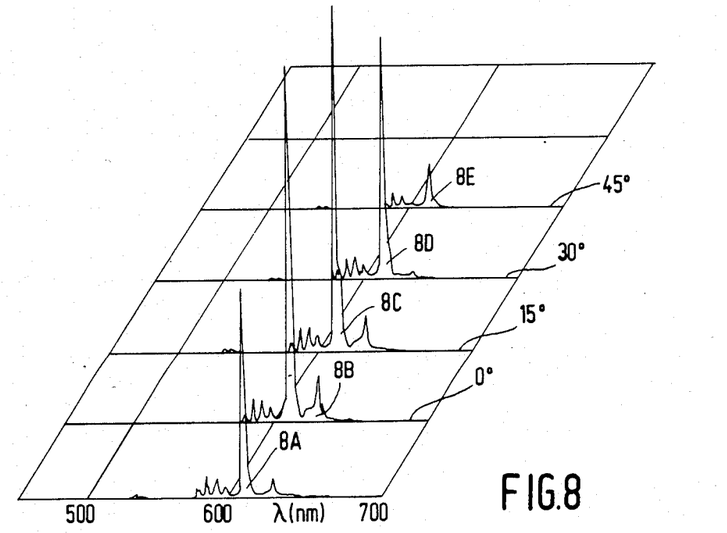
Figure 9A:
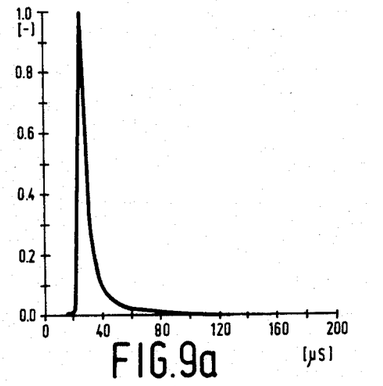
FIGS. 9a and 9b, 10a and 10b and 11a and 11b illustrate for typical blue, green and red phosphors, respectively, the instantaneous light output (FIGS. 9a, 10a and 10a) and the integrated light output (FIGS. 9b, 10b and 11b), after a short pulse (about 150 nanosec) electron beam excitation.
Figure 9B:
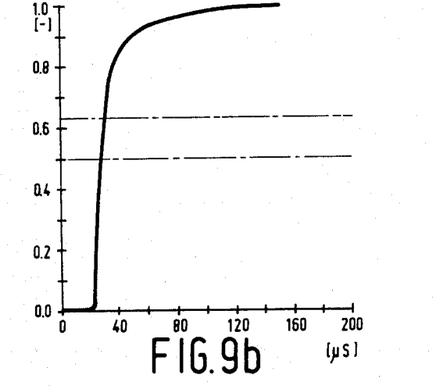
Figure 10A:
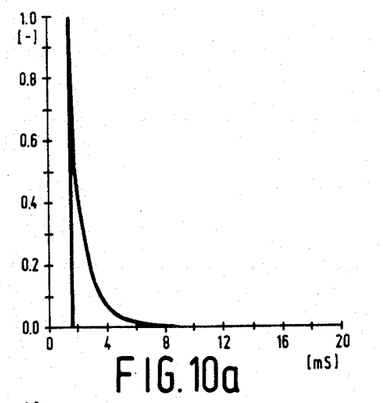
Figure 10B:
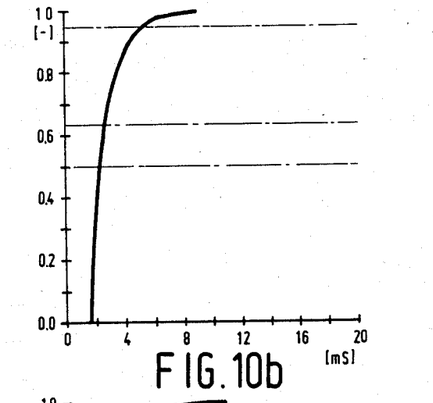
Figure 11A:
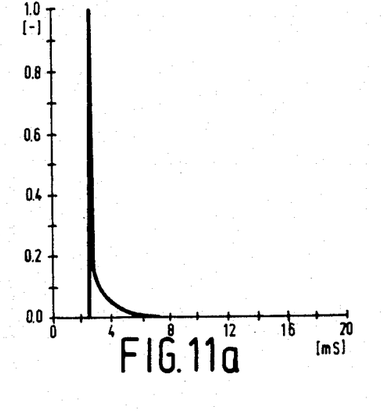
Figure 11B:
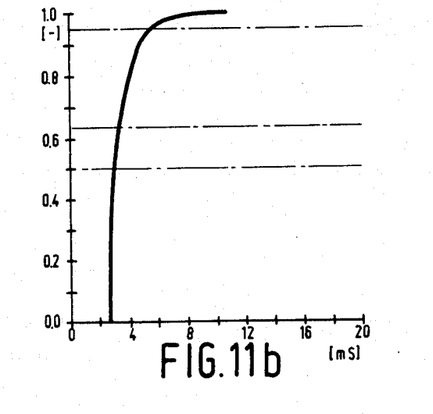
Figure 12:
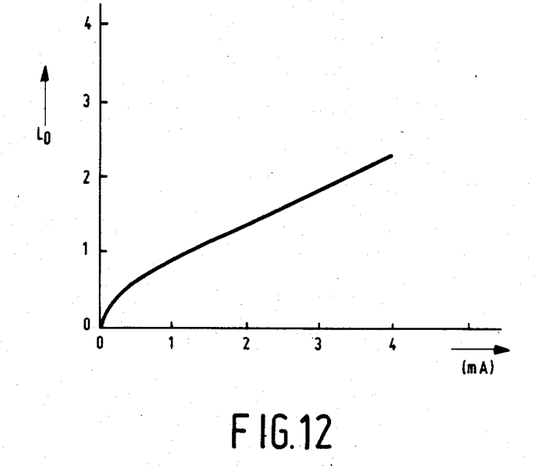
FIG. 12 is a graph showing light output $L_o$ versus beam current in mA of a typical blue phosphor.

Reference is now made to FIGS. 6, 7 and 8 which show the spectra produced in the wavelength (λ) range between 450 and 650 nanometers (nm) by the blue ZnS:Ag, the green $InBO_3$:Tb and the red $Y_2O_3$:Eu phosphors, respectively. The heights of the peaks indicate emission intensity in arbitrary units. The curves 6A, 7A and 8A represent the spectra produced when there is no interference filter present and the curves 6B to 6E, 7B to 7E and 8B to 8E relate to light emitted, when the interference filters are present, at angles of 0° (on axis), 15°, 30° and 45° to the axis. The Figures illustrate the beneficial effects of using shortwave pass interference filters including:

(1) the improved gain in luminance achieved in the desired spectral region for light emitted at forward and near forward directions, that is up to 30 to 35 deg. from the axis, (2) the narrowing of the broadband blue emission and the several spectral line green emission leading to a considerable reduction of the chromatic aberration in imaging on the projection screen. Importantly the blue spectra are broadband ones while the green and red spectra are principally line spectra. Therefore the gain in brightness by using a shortwave pass filter is less with the blue phosphor, typically of the order of 1.3, compared to the green and red phosphors, typically 1.5 to 1.8. Another known aspect of the blue phosphor is that when using it in combination with a shortwave pass interference filter the blue colour becomes deeper and more saturated so that less blue is needed to achieve white-D luminance. This is accounted for in the quoted gain factor of 1.3 which actually refers to the relevant ratio of lumen output and y colour co-ordinate. The gain factors in the green and red refer direclty to the respective lumen output values. Still another known aspect is that the persistence time of the blue phosphor is much shorter, typically 10 microseconds, than the persistence times of the green and red luminescing phosphors, typically 0.5 to 8 milliseconds. This is illustrated by the specimen curves for the blue ZnS:Ag, the green $InBO_3$:Tb and the red $Y_2O_3$:Eu phosphors, respectively in FIGS. 9a and 9b(blue), 10a and 10b(green) and 11a and 11b(red), FIGS. 9a, 10a and 11a show the instantaneous light output as intensity (peaking at a nomralized value of 1) versus time (in microseconds (μS) for blue and milliseconds (mS) for red and green, and the FIGS. 9b, 10b and 11b show the integrated light output after a short pulse (about 150 nanoseconds) electron beam. The significance of the saturation and short persistence time of the blue phosphor is that, in order to obtain white-D luminance on the projection screen with three single spot tubes with the same optimal focusing the blue tube requires a significantly larger electron beam current which will lead to a more rapid ageing of the blue phosphor as compared to good red and green phosphors. Also the spot size will be larger due to the increased beam current. In order to try and remedy this problem it is known to defocus vertically the blue spot so that as the electron beam raster scans the screen several adjacent lines are overwritten with an electron beam whose instantaneous intensity is related to the actual raster line being scanned. Such beam defocusing leads to a loss of vertical resolution The blue display tube 10 is a multispot tube which has at least two focused electron beams, the intensity of each electron beam being independently adjustable. This means that a raster line can be overwritten by a succession of focused electron beams at intervals significantly greater than 20 $\mu$s which beams have been modulated by the actual intensity information for that line. The beam current is significantly lower than in a single beam tube but the light output is greater. This can be deduced by considering the graph of FIG. 12 which shows light output ($L_o$) versus beam current (mA) of a typical projection television tube equipped with a blue phosphor. Increasing the beam current from 0.5 mA to 2 mA increases the light output by a factor of 2.2. However spreading this beam current equally over four electron beams produces a four-fold increase compared to 22 for a single 2 mA mA electron beam, resulting in an overall improvement in this example of 4/2.2 or 1.8. Additionally, the reduced beam current per beam means that the resolution will increase dependent upon the performance of the gun, since in general a smaller spot can be obtained at lower currents. The reduced loading of the blue phosphor will extend its useful working life.

Figure 13:
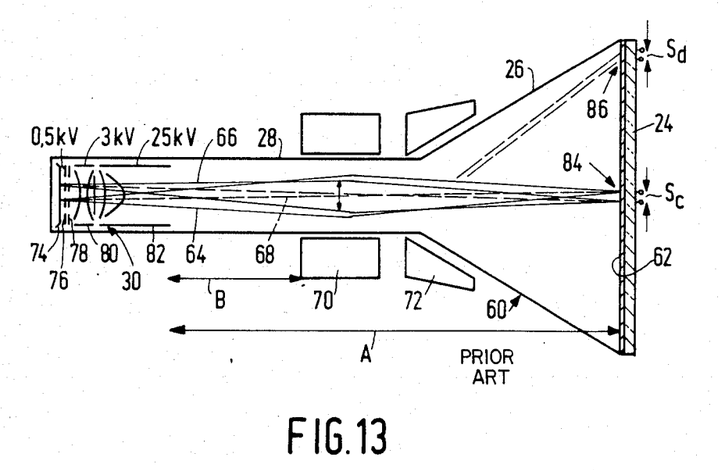
FIG. 13 is a diagrammatic axial cross-sectional view of an embodiment of a multispot blue light emitting display tube for use in the projection television system made in accordance with the present invention.

FIG. 13 illustrates diagrammatically an embodiment of a three beam multispot projection television tube 60 of the type disclosed in Ser. No. 110,054. For the sake of clarity only the centre and one of the outer beams 64, 66 are shown. The tube 60 comprises an envelope formed by a flat or curved faceplate 24 having a blue luminescing screen 62 which may comprise a short wave pass interference filter, a cone 26 and a neck 28. An electron gun system 30 is provided in the neck for generating the electron beams 64, 66 and focussing said generated electron beams on the display screen 62 by means of a focussing lens 70. The electron gun system 30 is connected to an external source of control and video data signals (not shown) with which each electron beam is controlled. The electron gun system 30 is centred around the tube axis 68. The electron beams are deflected over the display screen by means of deflection means 72. The lines of intersection of the beam envelopes of beams 64 and 66 with the plane of the drawing are shown. The electron beams are generated by means of a planar cathode 74, separate control electrodes 76 for each beam and an anode 78. The anode 78 consists of a metal plate extending substantially at right angles to the tube axis 68 and comprises apertures. Instead of this triode construction, it is of course also possible to use a number of so-called P-N cathodes which are situated in one plane.

The cathodes may be situated in a row or in a matrix on a flat or curved surface and at equal or variable distances from each other. The convergence lens is formed by two co-axially arranged cylindrical lens electrodes 80 and 82 having in the present embodiment a diameter of 10 mm. The diameter of the said cylindrical electrodes should be at least twice as large as the maximum eccentricity of the apertures in the said plate-shaped anode 78. Equipotential lines are shown between the electrodes 78, 80 and 82. The length of electrode 80 is smaller than the diameter and is 5 mm. The length of electrode 82 is 20 mm. The electron beams 64 and 66 are then focussed by the focussing means 70 and deflected over the display screen 62 by the deflection means 72. The distance A between electrode 82 and the display screen 62 in this embodiment is 280 mm. The distance B between electrode 82 and the focussing means 70 in this case is 100 mm. Both magnetic and electrostatic components or combinations thereof may be used for the focussing and deflection. For example, focussing may be done electrostatically and deflection may be done magnetically, or vice versa. It is also possible to perform the focussing simultaneously electrostatically and magnetically. By applying the potentials indicated in FIG. 13, the convergence lens has such a strength that the distance between the axis of the outer electron beam 66 and the axis 68 is at least five times smaller than the diameter of the individual beams 64 and 66 in the focussing and deflection means 70 and 72. During the deflection of the beams from the centre 84 of the display screen 62 towards the edge 86, the distance S between the spots formed on the display screen becomes smaller ($S_c$ (centre) $>S_d$ (edge)). By changing the potential applied to cylindrical electrode 80 from the value of 8 kV to 5 kV the distance between the spots on the display screen during the deflection becomes substantially constant ($S_c=S_d$). It is possible to make the distance entirely constant by energizing the convergence lens between the electrodes 80 and 82 dynamically during the deflection. It is also possible to place external magnetic coils around the neck of the tube, generating multipole fields that correct for the varying spot distance. The current through these coils has to be varied also dynamically with deflection. During the deflection, focussing is preferably done dynamically by means of the focussing means.

By making the eccentricity of the electron beams small with respect to the beam diameters in the deflection and focussing means 70, 72 one focussing lens may be used as a result of which all beams are focussed to substantially the same extent and substantially no distortion of the spot frame occurs during the deflection of the beams.

In operation of the multispot tube 60 having say three electron beams, then in the case of television raster scanning each line is rewritten three times, for example three times with an interval of one line period between successive lines. By connecting a source of video data 99 to modulating means 100 (FIG. 14) such as series connected line stores 101, 102 and 103, and having the source and outputs of the line stores connected to respective cathodes or grids (that is a planar array of a plurality of mutually insulated apertured sections each with its own input connection, 104, 105 and 106, respectively), each beam can be modulated at the correct instant.

Figure 14:
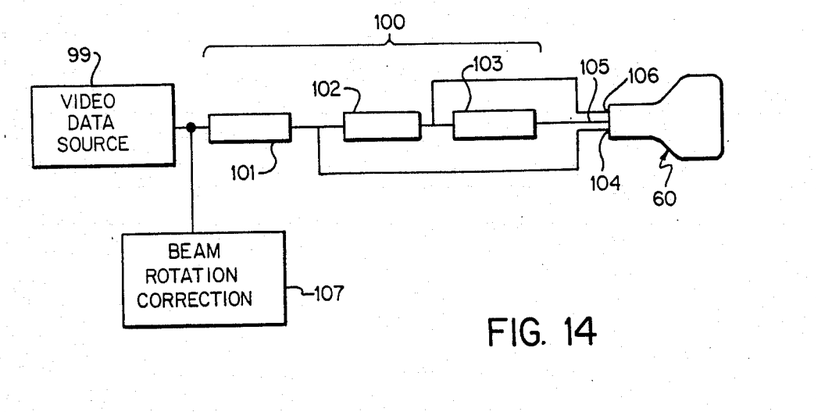
FIG. 14 is a block schematic diagram showing an embodiment of a system for successively modulating the individual beams of a multispot blue light display tube with video data.

An additional refinement will be necessary if the focusing means are electromagnetic which cause skewing of the electron beams, that is a rotation of the plane passing through the centres of the electron beams, emerging from the triode section, that is electrodes 74, 76 and 78, of the electron gun. While this skewing effect can be useful as a technique for reducing the vertical height between adjacent electron beams, additional beam rotation correction means 107, for example shift registers, are necessary to ensure that the video data is applied to the respective beams at the correct instant.

What is claimed is:

1. A projection colour television system comprising a red light emitting display tube, a green light emitting display tube and a blue light emitting display tube, each tube comprising: a glass envelope including a display window, a cone and a neck; a cathodoluminescent phosphor screen on the inside of the display window; and an electron gun located in the neck; the red and green light emitting display tubes each including a short wave pass interference filter disposed between the phosphor and the faceplate; and each tube further comprising a system of deflection coils around the neck of the tube envelope to deflect the electron beams in two mutually perpendicular directions, x, y;

characterized in that the electron gun of only the blue light emitting display tube comprises means for producing at least two focused, vertically separated and independently adjustable electron beams.

2. A system as claimed in claim 1, in which the blue light emitting display tube includes a short wave pass interference filter disposed between the phosphor and the faceplate.

3. A system as claimed in claim 1, in which the electron gun of the blue light emitting display tube gun for producing at least two electron beams comprises a triode having a cathode, an apertured grid and an apertured anode, the cathode or grid comprising at least two individually addressable sections, each section having an input to which video data is applied in use.

4. A system as claimed in claim 3, in which there are: n, where n is at least two, electron beams in said blue display tube ; means for modulating the beams comprising (n−1) series arranged line stores; and a source of video data connected to an input of a first of said (n−1) line stores, wherein each section of the cathode or grid is coupled respectively to said source of video data or an output of a line store.

5. A system as claimed in claim 4, in which the blue light emitting display tube has electromagnetic focusing and means are provided for correcting the rotation of the electron beams relative to each other.

6. A system as claimed in claim 1, characterized in that the faceplate of each display tube is substnatially flat.

7. A system as claimed in claim 1, in which the faceplate of each display tube is convex as viewed from the phosphor.

8. A system as claimed in claim 1, in which the display tubes are arranged as a planar array.

9. A system as claimed in claim 1 in which the display tubes are arranged on three sides of a square with two of the display tubes facing each other, and dichroic mirrors are provided for reflecting the light produced by the facing display tubes in the same direction as the light from the third display tube.

10. A system as claimed in claim 2, in which the means in the blue light emitting display tube for producing at least two electron beams comprises a triode type of electron gun having a cathode, an apertured grid and an apertured anode, the cathode or grid comprising at least two individually addressable sections, each section having an input to which video data is applied in use.

11. A system as claimed in claim 10, in which there are: n, where n is at least two, electron beams in said blue display tube ; means for modulating the beams, compris ing (n−1) series arranged line stores; and a source of video data connected to an input of a first of said (n−1) line stores, wherein each section of the cathode or grid is coupled respectively to said source of video data or an output of a line store.

12. A system as claimed in claim 11, in which the blue light emitting display tube has electromagnetic focusing and means are provided for correcting the rotation of the electron beams relative to each other.

* * * * *